United States Patent [19]

Fogelberg

[11] 4,111,288
[45] Sep. 5, 1978

[54] GEAR CHANGING MECHANISM

[75] Inventor: Mark John Fogelberg, Muncie, Ind.

[73] Assignee: Borg-Warner Corporation, Chicago, Ill.

[21] Appl. No.: 755,698

[22] Filed: Dec. 30, 1976

[51] Int. Cl.$^2$ .................. F16D 41/08; F16D 47/00
[52] U.S. Cl. ........................... 192/38; 192/44; 192/48.92
[58] Field of Search .............. 192/38, 44, 48.91, 48.92

[56] References Cited
U.S. PATENT DOCUMENTS

| | | | |
|---|---|---|---|
| 2,051,386 | 8/1936 | Murray | 192/44 X |
| 2,061,288 | 11/1936 | Murray | 192/48.92 |
| 3,426,874 | 2/1969 | Johnston, Jr. | 192/38 |
| 3,707,884 | 1/1973 | Go | 192/44 |
| 3,949,848 | 4/1976 | Fogelberg | 192/38 |

*Primary Examiner*—Allan D. Herrmann
*Attorney, Agent, or Firm*—Julian Schachner

[57] ABSTRACT

A pair of bi-directional roller clutches are connected through outer races to separate gear sets and share a common inner race connected to a driven shaft. A shifting member is slidably mounted on the common inner race and is selectively engagable with the retainers of the roller clutches, thereby locking the rollers of the engaged clutch in the free-wheeling mode and releasing the rollers of the other clutch, allowing that clutch to engage when its races are rotating at synchronous speeds and thus drive through its associated gear set.

11 Claims, 12 Drawing Figures

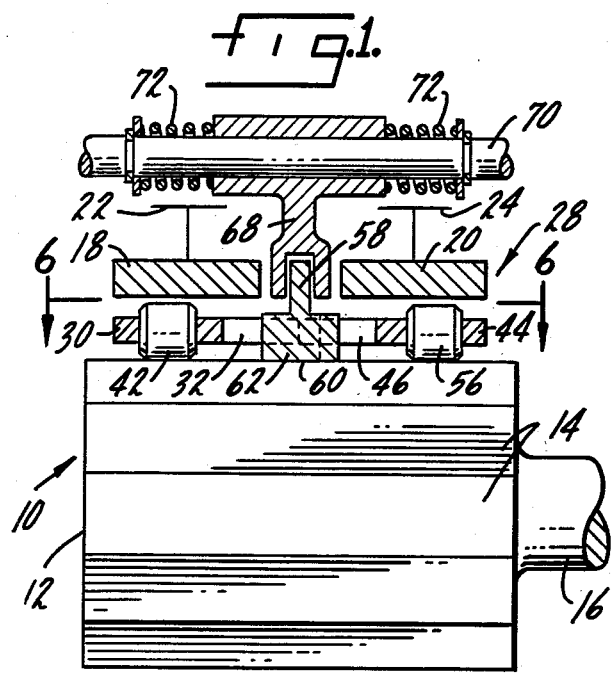
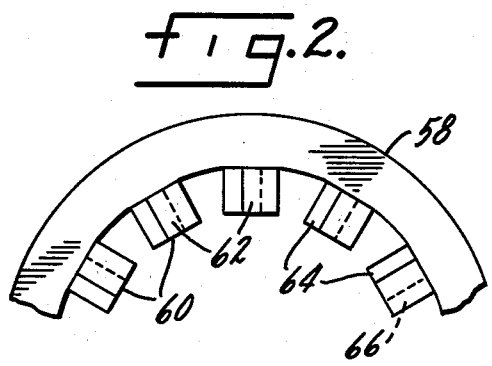
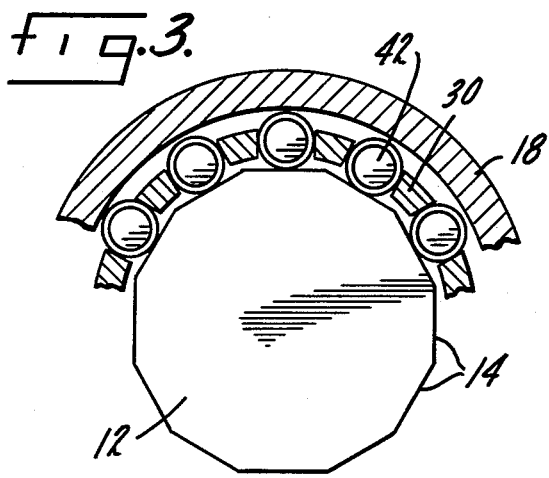
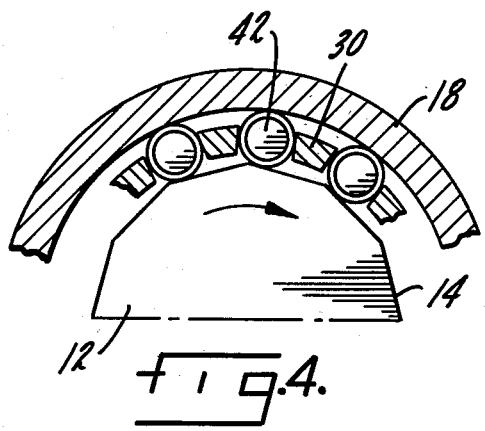
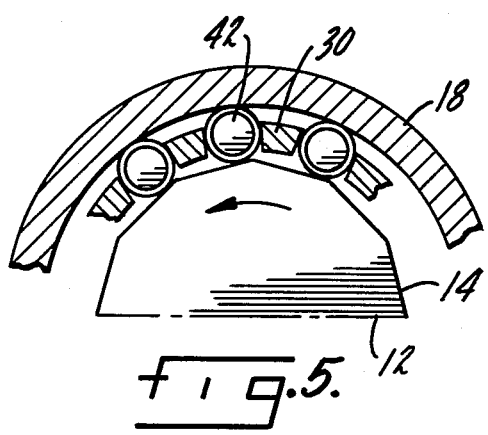
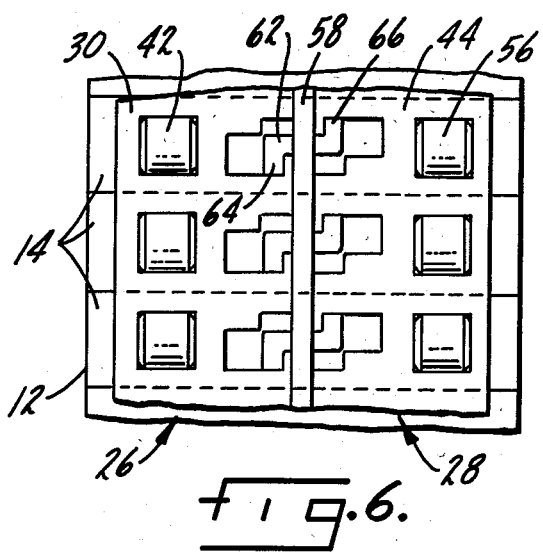

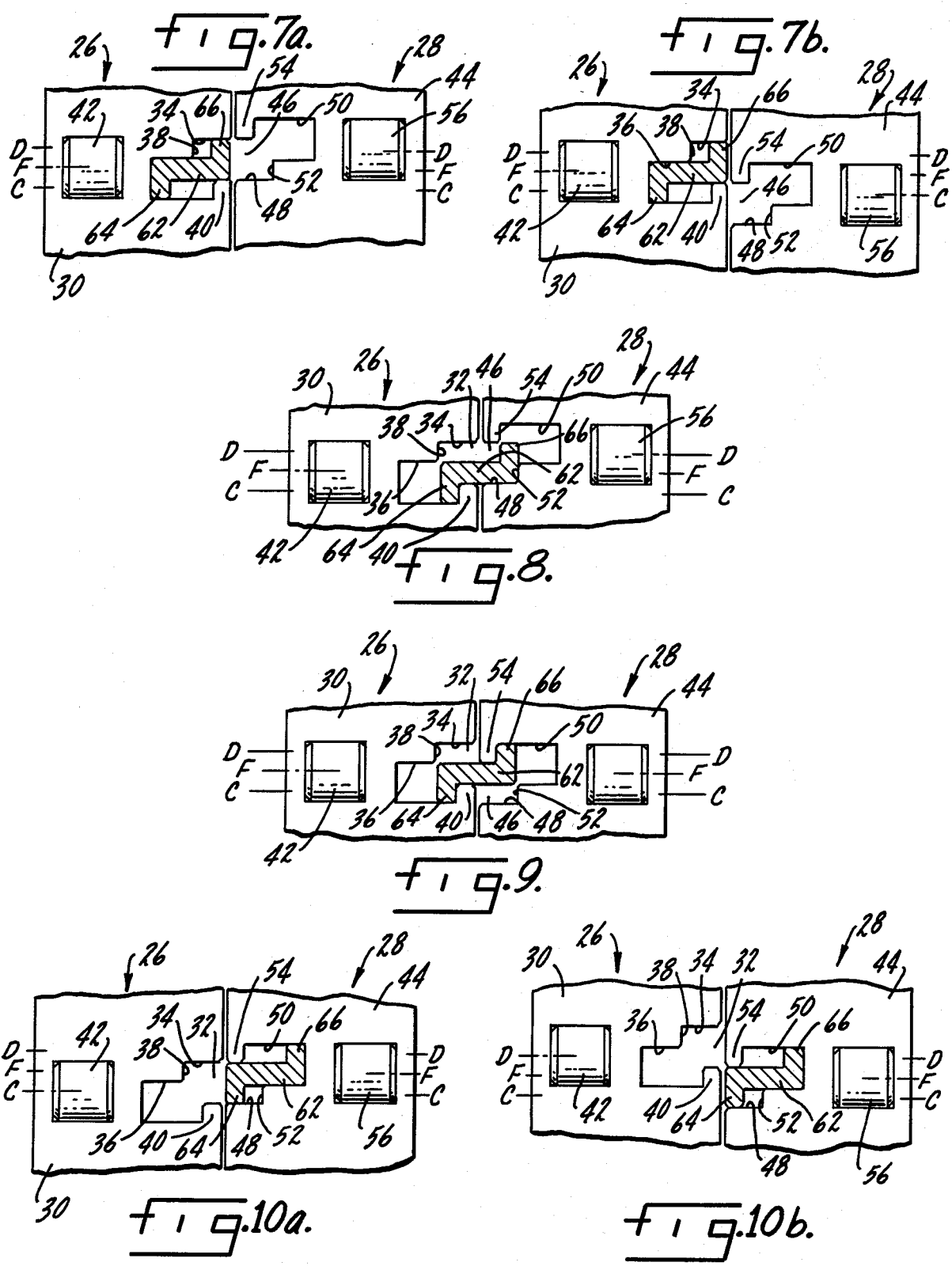

GEAR CHANGING MECHANISM

BACKGROUND OF THE INVENTION

This invention relates generally to gear changing mechanisms, and more particularly to a gear changing mechanism suitable for use with an automotive transmission incorporating two or more gear sets where it is acceptable to momentarily interrupt the power to change from one gear ratio to another.

In recent years there have been many improvements in gear changing mechanisms, including improvements related to reversible overrunning clutches adapted for use in transferring torque through a power train in an automotive vehicle. Some of these gear changing mechanisms are adapted for unidirectional transmission of torque. Others, while capable of driving in two directions, generally require mechanical elements such as cams for shifting the direction of drive or for shifting from a drive position to a freewheel position.

Such gear changing mechanisms generally incorporate elaborate drive structure, including mechanical elements for effecting a change in position of sets of balls or rollers so as to shift drive ratios or shift between a drive ratio and a freewheel position within the mechanism itself. In addition, such mechanisms generally incorporate elaborate and complicated shift elements.

The gear changing mechanism of U.S. Pat. No. 3,949,848 issed Apr. 13, 1976 discloses a pair of bidirectional roller clutches, one of which may be held in a disengaged condition while the other is released to engage for driving through an associated gear set. However, this mechanism has the disadvantage that engagement may take place when the clutch input and output are rotating at different speeds. Severe shocks to the driveline may result.

SUMMARY OF THE INVENTION

This invention is directed in brief to an improved gear changing mechanism which will eliminate such shocks. The mechanism is adapted for use in an automotive transmission incorporating at least a two-speed gear set, and particularly for use in a transmission incorporating an overdrive gear set where it is acceptable to momentarily interrupt the power to change from one gear ratio to another. It may be used in an automotive transmission that now uses synchronizers to select various gear ratios, for example where a sun gear is locked to the planet carrier for direct drive and locked to the housing for overdrive.

The mechanism includes a pair of bi-directional roller clutches sharing a common inner race, and a shifting member adapted to hold either of the clutches in a neutral, freewheeling position. Besides the common inner race, each of the clutches includes a set of rollers guided by a retainer, and an outer race in the form of a cylindrical ring. The inner race is provided with a series of plane facets, each facet cooperating with a roller such that if the rollers are allowed to move, they become wedged between the facets and the outer race, thereby transmitting torque. If the rollers are held in the center of the facets, clearance exists between them and the outer race, and the clutch freewheels.

The shifting member engages the first clutch retainer, thereby holding its rollers in the freewheeling position. At the same time, the second retainer is released, allowing that clutch to engage upon the application of torque and to drive through its associated gear set. The shifting member is moved to a central position in which, in response to a torque (or speed) reversal, one clutch may engage in the drive mode, the other may engage in the coast mode, or either may freewheel. The shifting member then moves to engage the second clutch retainer, thereby holding its rollers in the freewheeling position. At the same time, the first retainer is released, allowing that clutch to engage, and to drive through its associated gear set.

BRIEF DESCRIPTION OF THE DRAWINGS

The objects and advantages of this invention will become apparent to those skilled in the art upon careful consideration of the specification herein, including the drawings, wherein:

FIG. 1 is an elevational view, partially in section, showing details of the two clutch assemblies and the shifting member;

FIG. 2 is a partial elevational view of the shifting member;

FIG. 3 is a cross-sectional view through a portion of the clutch assembly showing the relative position of the parts in the freewheeling mode of operation;

FIG. 4 is a cross-sectional view through a portion of the clutch assembly showing the relative position of parts in the driving mode of operation;

FIG. 5 is a cross-sectional view through a portion of the clutch assembly showing the relative position of the parts in the coasting mode of operation;

FIG. 6 is a plan view, taken along the line 6—6 of FIG. 1, showing the two retainer assemblies and their rollers sharing the common inner race, as well as the central position of the shifting member;

FIG. 7a is an enlarged, partial view similar to FIG. 6, showing the shifting member in one engaging position, holding one of the clutches in its freewheeling mode while the other clutch is in the driving mode;

FIG. 7b is a view similar to FIG. 7a, showing the other clutch in the coasting mode;

FIG. 8 is a view similar to FIG. 7a, showing the position of the clutches with the shifting member in the central position, before the momentary torque reversal has taken effect;

FIG. 9 is a view similar to FIG. 8, showing the position of the clutches with the shifting member in the central position, during the momentary torque reversal.

FIG. 10a is a view similar to FIG. 9, showing the position of the clutches with the shifting member in the other engaging position, after the torque reversal has taken effect; and FIG. 10b is a view similar to FIG. 10a, showing the position of the clutches after the shifting operation has been completed. One clutch is in the driving mode for transmitting torque while the other clutch is held by the shifting member in its freewheeling mode.

While this invention is susceptible of embodiment in many different forms, there is shown in the drawings and will herein be described in detail a preferred embodiment, with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, there is shown a gear changing mechanism 10 which is particularly useful in association with automotive transmissions where it is acceptable to momentarily interrupt the power to change from one gear ratio to another.

Gear changing mechanism 10 includes an inner race 12 which defines a plurality of plane facets 14 on the periphery thereof. Inner race 12 is adapted to drive a suitable output shaft 16. A pair of outer races 18 and 20 are spaced from inner race 12. Outer races 18 and 20 are adapted to be driven by suitable gear sets 22 and 24, respectively.

A pair of bi-directional roller clutches 26 and 28 share a common inner race 12. Clutch 26 is associated with outer race 18, and clutch 28 is similarly associated with outer race 20.

Clutch 26 includes a retainer 30 defining a plurality of stepped, inwardly opening grooves 32, each having an inner portion 34 and an outer portion 36 determined by a surface 38. At its inner end, retainer 30 defines a plurality of fingers 40, each extending into an inner portion 34 of its associated groove 32. A suitable roller 42 or the like is supported by retainer 30 outwardly of each groove 32. Each roller 42 cooperates with a corresponding facet 14 of inner race 12.

Similarly, clutch 28 includes a retainer 44 defining a plurality of stepped, inwardly opening grooves 46, each having an inner portion 48 and an outer portion 50 determined by a surface 52. At its inner end, retainer 44 defines a plurality of fingers 54, each extending into an inner portion 48 of its associated groove 46. A suitable roller 56 or the like is supported by retainer 44 outwardly of each groove 46. Rollers 56 cooperate with facets 14 of inner race 12 in a manner similar to rollers 42.

A selecting member 58 has a central opening with a plurality of plane surfaces 60. Surfaces 60 are cooperable with facets 14 of inner race 12 such that together they form a spline by which selecting member 58 is retained on inner race 12. Selecting member 58 is rotatable with and slidable along inner race 12.

Selecting member 58 defines a plurality of Z shaped engaging elements 62 extending outwardly therefrom, each including fingers 64 and 66 extending therefrom. Each engaging element 62 is capable of being moved into a corresponding groove 32 of clutch 26 or groove 46 of clutch 28. Fingers 64 and 66 are cooperable with fingers 40 and 54, respectively, as hereinafter disclosed.

A suitable shifting fork 68 is slidably mounted on an actuator rod 70 and held axially by preloaded overcenter springs 72. Actuator rod 70 is connected through suitable linkage or the like to the operator's control and adapted so that whichever gear ratio is desired can be preselected by the operator, the actual movement of shifting fork 68 and selecting member 58 being completed in a conventional manner rapidly and at the proper time by springs 72.

When rollers 42 and 56 of clutches 26 and 28, respectively, are oriented such that they are in the center of facets 14 of inner race 12, there is clearance between the rollers and their associated outer races 18 and 20. This condition obtains when engaging elements 62 of selecting member 58 are moved into either inner portion 36 of groove 32 or inner portion 50 of groove 46, thereby holding the associated retainer 30 or 44 in the central position. In this position the clutch so held is in its freewheeling mode, as shown in FIG. 3, while the other clutch is capable of transmitting torque in its driving mode, as shown in FIG. 4, or its coasting mode, as shown in FIG. 5. The clutch not so held is free such that its retainer is allowed to move, and in response to the application of torque its rollers become wedged between inner race 12 and outer race 18 or 20, thereby transmitting torque.

Thus, it should be clear that the clutch engaged by the shifting sleeve is held in the freewheeling position while the clutch not so engaged may transmit torque in either of its driving or coasting positions.

In FIG. 7a, selecting member 68 has been moved to the left such that elements 62 are within grooves 32, thereby engaging retainer 30 and holding rollers 42 in a central position relative to facets 14. In this position clutch 26 is held in its freewheeling mode (F). As shown, clutch 28 is transmitting torque in its driving mode (D).

The changing of gear ratios is initiated by causing selecting member 68 to move rightwardly to the position shown in FIG. 8, wherein each engaging element 62 is within its associated inner portions 34 and 48 of grooves 32 and 46, respectively, with fingers 64 and 66 abutting finger 40 and surface 52. Clutch 26 is still in freewheel, and clutch 28 is still transmitting torque in drive. To complete the shift, it is necessary to interrupt the power by a momentary torque reversal. This may be accomplished, for example, by an operator releasing the throttle in an automobile. The engine begins to slow down, and clutch 28 moves out of drive, but is held in the freewheel position shown in FIG. 9. When the engine slows down to the point where inner race 12 and outer race 18 are rotating at the same speed, clutch 36 engages in the coast mode (C) shown in FIG. 10a. Finger 40 clears finger 64, and engaging element 62 is moved by spring loading means 72 into inner portion 50 of groove 46. This frees retainer 30 for movement to the position shown in FIG. 10b to engage clutch 36 in drive upon the operator reengaging the throttle in an automobile.

The changing of gear ratios when in the coast mode is the same. When clutch 28 is in coast, as shown in FIG. 7b, action to cause selecting member 68 to move rightwardly and a first torque reversal (engaging the throttle) will move clutch 28 to drive (FIG. 7a). Fingers 54 clear fingers 66, and engaging element 62 moves to the position shown in FIG. 8. Upon a second torque reversal (releasing the throttle), both clutches will move toward coast. Clutch 28 will be held in freewheel (FIG. 9), and when inner race 12 and outer race 18 are rotating at the same speed, clutch 26 engages in coast. Engaging element 62 then will be moved by spring loading means 72 to the position shown in FIG. 10a.

Obviously, shifting gears in the opposite direction is accomplished by a similar operation, and again may be to either of the driving or coasting modes, as determined by the operator.

Thus, it will be seen that the invention comprises a compact and simple gear changing mechanism which allows for the initiation of the gear changing operation by controlled means and the completion of the operation automatically upon a torque reversal.

An important advantage of this invention over that disclosed in the aforementioned U.S. Pat. No. 3,949,848 is that when the vehicle is moving downhill, for example, engine braking is always available through one or the other of the clutches without requiring throttle engagement by the operator.

Although the gear changing mechanism has been disclosed herein as applied to an automotive vehicle, it should be understood that it may be used in other settings. While a preferred embodiment of the invention has been shown and described, it should be considered as illustrative and may be modified by those skilled in the art without departing from the scope thereof, which is to be limited only by the claims herein.

I claim:

1. In a torque transfer mechanism, the combination comprising first means including first and second races, second means including a third race, first and second bi-directional clutches between said first and second races, respectively, and said third race, and shifting means engageable with said first clutch for positioning said first clutch in a freewheeling mode and rendering said second clutch positionable selectively in driving and coasting modes in response to the transfer of torque through the mechanism, said shifting means being engageable with said first and second clutches for rendering one of said clutches positionable selectively in freewheeling and coasting modes and the other of said clutches positionable selectively in driving and freewheeling modes in response to a torque reversal, said shifting means being engageable with said second clutch for positioning said second clutch in a freewheeling mode and rendering said first clutch positionable selectively in driving and coasting modes in response to the transfer of torque through the mechanism.

2. The invention according to claim 1, said third race defining a plurality of plane facets, and each of said clutches including a retainer supporting a plurality of wedging elements, each retainer being rotatable relative to said races between said freewheeling mode in which each element is loosely supported between a facet and a first or second race, said driving mode in which each element is wedged between a facet and a first or second race for torque transfer in one direction, and said coasting mode in which each element is wedged between a facet and a first or second race for torque transfer in the opposite direction.

3. The invention according to claim 2, said shifting means being slidable relative to said races between positions selectively engaging said first and second retainers for effecting said engagement of said first and second clutches, respectively.

4. A torque transfer mechanism comprising a first race adapted for connection in a power train, a pair of second races each adapted for connection in the power train, said second races being spaced from each other and from said first race, a pair of retainers each supporting a plurality of wedging elements between said first race and a second race, said retainers being movable relative to said races to a freewheeling position in which said elements are loosely supported between said first and second races, a driving position in which said elements are wedged between said first and second races for torque transfer in one direction, and a coasting position in which said elements are wedged between said first and second races for torque transfer in another direction, and shifting means movable selectively to a first position engaging one retainer in said freewheeling position and freeing the other retainer for movement to either of said torque transferring positions, to a second position preventing movement of said one retainer to one torque transferring position and preventing movement of said other retainer to the other torque transferring position, and to a third position engaging said other retainer in said freewheeling position and freeing said one retainer for movement to either of said torque transferring positions.

5. The invention according to claim 4, said retainers being rotatable relative to said first race between said freewheeling, driving and coasting positions, and said shifting means being slidable relative to said first race between said first, second and third positions.

6. The invention according to claim 4, said retainers respectively defining first and second inwardly facing grooves each having inner and outer portions, said shifting means being between said retainers and in said first groove in said first position, in said inner portions of said first and second grooves in said second position, and in said second groove in said third position.

7. The invention according to claim 6, said inner and outer portions being offset from each other such that said shifting means is movable between said first and second positions when said one retainer is in said freewheeling position and said other retainer is in a torque transferring position and between said second and third positions when said other retainer is in said freewheeling position and said one retainer is in a torque transferring position.

8. The invention according to claim 4, said shifting means being movable from said first position to said second position and being prevented from moving to said third position by both of said retainers, said retainers being movable when said shifting means is in said second position to free said shifting means for movement to said third position.

9. A torque transfer mechanism comprising first and second clutches each having an input and an output, and shifting means engageable with said first clutch for positioning it in a neutral condition, thereby rendering said second clutch positionable in at least one torque transferring condition in response to the transfer of torque through said mechanism, said shifting means being engageable with said first and second clutches for rendering said second clutch positionable in a neutral condition in response to a torque reversal, said shifting means being disengageable from said first clutch upon movement of its input and output at synchronous speeds and engageable with said second clutch for positioning it in a neutral condition, thereby rendering said first clutch positionable in at least one torque transferring condition in response to the transfer of torque through said mechanism.

10. The invention according to claim 8, each of said torque transferring conditions being one of drive and coast conditions.

11. A torque transfer mechanism comprising first and second clutches each movable between a freewheel condition and two torque transferring conditions, and shifting means movable between first, second, and third clutch-engaging positions, said shifting means when in said first position engaging said first clutch in said freewheel condition and freeing said second clutch for movement to said torque transferring conditions under the influence of torque, said shifting means when in said second position engaging said first and second clutches for preventing movement of said first clutch to one torque transferring condition and said second clutch to the other torque transferring condition under the influence of torque, said shifting means when in said third position engaging said second clutch in said freewheel condition and freeing said first clutch for movement to said torque transferring conditions under the influence of torque, said shifting means being movable between said first and second positions only when said second clutch is in said one torque transferring condition, said shifting means being movable between said second and third positions only when said first clutch is in said other torque transferring condition.

* * * * *

UNITED STATES PATENT OFFICE
CERTIFICATE OF CORRECTION

PATENT NO. : 4,111,288
DATED : September 5, 1978
INVENTOR(S) : MARK JOHN FOGELBERG It is certified that error appears in the above-identified patent and that said Letters Patent are hereby corrected as shown below:

Column 4, line 29, cancel "36" and insert -- 26 --.

Column 4, line 34, cancel "36" and insert -- 26 --.

Signed and Sealed this

Fifth Day of June 1979

[SEAL]

Attest:

RUTH C. MASON
Attesting Officer

DONALD W. BANNER
Commissioner of Patents and Trademarks